Patented Nov. 7, 1944

2,361,928

UNITED STATES PATENT OFFICE 2,361,928

SENSITIZED PHOTOGRAPHIC EMULSION

Burt H. Carroll and John Spence, Rochester, N. Y., assignors to Eastman Kodak Company, Rochester, N. Y., a corporation of New Jersey No Drawing. Application December 4, 1942, Serial No. 467,900

16 Claims. (Cl. 95—7)

This invention relates to sensitized photographic emulsions and more particularly to spectrally (optically) sensitized emulsions.

It is known that the distribution of spectral sensitivity of certain spectrally sensitized emulsions can be altered and an increase of sensitivity obtained in some spectral region, by incorporating certain additional sensitizing dyes in the spectrally sensitized emulsions. (See United States Patents 2,158,882, dated May 16, 1939, and 2,159,565, dated May 23, 1939.) The effect thus obtained has come to be known as supersensitization. Supersensitization of certain spectrally sensitized emulsions can also be effected by incorporating certain substantially colorless heterocyclic bases, viz. those containing an amino group, in the spectrally sensitized emulsions. (See United States Patent 2,177,635, dated October 31, 1939.) Supersensitization differs from hypersensitization which involves bathing of finished plates or films, an operation which normally reduces the pAg and increases the pH of the emulsions, with consequent decreased stability.

We have now found a new method for supersensitizing spectrally sensitized emulsions, which not only does not reduce the stability of the emulsions, but is especially valuable as a means of giving panchromatic sensitized emulsions of high speed and exceptionally good color balance.

It is, accordingly, an object of our invention to provide new supersensitized photographic emulsions. A further object is to provide a process for preparing such emulsions. Still other objects will become apparent hereinafter.

In accordance with the invention, a photographic silver halide emulsion spectrally sensitized with a cyanine or merocyanine dye is supersensitized by incorporating in the emulsion an ester of a pyridine (azine) or quinoline (1-benzazine) carboxylic acid. Pyridines or quinolines containing strongly electronegative groups, such as CN, NO₂, or SO₃H (or its salt forms) are advantageously avoided. Exemplary of the esters of pyridine and quinoline carboxylic esters are the following:

Ethyl picolinate (ethyl ester of 2-pyridine carboxylic acid).
Methyl nicotinate (methyl ester of 3-pyridine carboxylic acid).
Methyl quinaldinate (methyl ester of 2-quinoline carboxylic acid).
Methyl picolinate (methyl ester of 2-pyridine carboxylic acid).
Ethyl nicotinate (ethyl ester of 3-pyridine carboxylic acid).

Esters of pyridine or quinoline carboxylic acids and alcohols, especially alcohols of the formula $C_nH_{2n+1}OH$ wherein $n$ represents a positive integer, particularly those wherein $n$ represents a positive integer of from one to two are advantageously employed. Practically all of the esters of pyridine and quinoline carboxylic acids which supersensitize in accordance with our invention fall within a definite range of solubility in gelatin. For this purpose solubility is defined by the appearance of optical homogeneity in gelatin sheets containing the pyridine or quinoline carboxylate. The solubility can be determined in the following way: the ester of the pyridine or quinoline carboxylic acid, dissolved in the minimum amount of methyl or ethyl alcohol or acetone, is added to an aqueous solution (70 g. of gelatin in 1000 cc. of water) and the resulting dispersion is coated on glass. When dry, the coated plate is examined for optical homogeneity. The effective esters of the pyridine and quinoline carboxylic acids all give practically homogeneous gels in concentrations of from about 7 to about 20 grams of ester per 100 grams of gelatin. Outside this range of concentration, the efficacy of the esters falls off very rapidly.

The majority of cyanine dyes which are supersensitized by the esters of pyridine or quinoline carboxylic acids are characterized by the fact that the dyes produce two types of sensitization depending upon conditions. Such different types of sensitization are described by Leermakers, Carroll and Staud, J. Chem. Physics 5, 878 (1937) and by G. Schwarz—Sc. et. Ind. Phot. 10, 233 (1939). When a cyanine dye of this type is used as a sensitizer in low concentration, it exhibits a sensitizing maximum displaced about 20 to 50 mu toward the red from the absorption maximum in ethyl alcohol. On increasing the concentration of the dye, or upon digesting the emulsion containing the dye in the lower concentration, or both, a second maximum of sensitization develops at longer wavelengths, accompanied by an increase in total optical sensitization. In some cases, a decrease in sensitivity at the first maximum can be detected. These phenomena are consistent with the hypothesis of two states of the sensitizing dye in an equilibrium which is controlled by concentration. The esters of pyridine and quinoline carboxylic acids favor the formation of a second maximum which occasionally is appreciably displaced from the normal second maximum. The increase in sensitivity apparently corresponds to increased conversion of the dye to the state corresponding to the second maximum of sensitization. In some cases, the effect appears to correspond to a more complete conversion than has ever been obtained without a supersensitizer, and in any case the long wavelength sensitivity is better than can be obtained from the same concentration of dye without the ester of the pyridine or quinoline carboxylic acid.

The following are exemplary of the cyanine dyes which can be markedly supersensitized in accordance with our invention:

1',3-diethyl-6'-methoxythia-2'-cyanine iodide
3,3',9-triethylthiacarbocyanine iodide
3,3'-diethyl-9-methylthiacarbocyanine bromide
5,5'-dichloro-3,3',9-triethylthiacarbocyanine bromide
5,5'-dichloro-9-ethyl-3,3'-di-(β-hydroxyethyl)-thiacarbocyanine bromide
5,5'dibromo-3,3',9-triethylthiacarbocyanine bromide
3,3'-diethyl-9-methylselenacarbocyanine bromide
3,3'-diethyl-9-methyl-4,5,4',5'-dibenzothiacarbocyanine bromide The effect of the esters of the pyridine and quinoline carboxylic acids is most pronounced with the less soluble merocyanine dyes, although, in general, the supersensitization of the merocyanines is of a lower order than that of the cyanines. 3-ethyl-5-(3-ethyl-2-benzothiazolylidene-isopropylidene)-2-thio-2,4(3,5)-oxazoledione, 3-ethyl-5-(3-ethyl-2-benzoxazolylidene-ethylidene)-rhodanine and 3-ethyl-5-[(3-ethyl-5-methyl-2(3)-1,3,4-thiadiazolylidene) ethylidene] rhodanine are typical merocyanines which respond readily to the action of esters of pyridine and quinoline carboxylic acids. The effect of the esters is more marked with complex merocyanine dyes, such as are described in the copending application of Leslie G. S. Brooker, Serial No. 316,002, filed January 28, 1940, e. g. merocarbocyanine dyes of the following general formula:

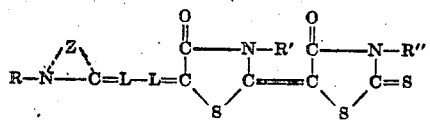

wherein L represents a methine group, R represents a substituted or unsubstituted alkyl group, R' and R'' represent alkyl or aryl groups, substituted or unsubstituted, and Z represents the non-metallic atoms necessary to complete a heterocyclic nucleus, such as used in cyanine dyes, e. g. benzothiazole, benzoxazole, β-naphthothiazole, etc.

The sensitizing dyes can be employed in any desired concentration. Ordinarily from 10 to 30 mg. of dye per liter of emulsion will suffice to produce the optimum sensitizing effect. The methods of incorporating sensitizing dyes in emulsions are well known to those skilled in the art. Ordinarily, it is preferable to dissolve the dye in a water-miscible solvent, such as methanol, before incorporation in the emulsion. Ethyl alcohol or acetone may be used when the solubility of the dye in methanol is very low. One or more sensitizing dyes can be employed.

The amount of the ester of the pyridine or quinoline carboxylic acid is not critical. Usually the full supersensitizing effect is developed at a concentration of from 1 to 10 grams of ester per liter of emulsion. The esters can be added with, before, or after the sensitizing dye or dyes. The esters are preferably, but not necessarily, diluted with a water-miscible solvent, such as methanol, before incorporation in the emulsion. One or more esters can be employed and the esters, as well as the sensitizing dyes, can be added to the emulsion during any convenient stage of its preparation, although preferably to the washed, finished emulsion.

The following examples will serve to illustrate results obtained in accordance with our invention.

Example 1

A fast negative gelatino-silver-bromiodide developing-out emulsion was sensitized with 3,3'-diethyl-9-methylselenacarbocyanine bromide (20 mg. per liter of emulsion) and to the spectrally sensitized emulsion was added ethyl picolinate. A portion of the spectrally sensitized emulsion was exposed without, and another portion with the addition of the ester, through red (Wratten 25) and minus blue (Wratten 12) filters, the latter giving a good measure of the total optical sensitivity.

| Ethyl picolinate (cc. per liter of emulsion) | Red | | Minus blue | | Fog |
|---|---|---|---|---|---|
| | Speed | Gamma | Speed | Gamma | |
| None | 52.5 | 1.22 | 340 | 1.18 | .05 |
| 1.25 | 162.0 | 1.29 | 525 | 1.29 | .06 |

Example 2

Another batch of a fast negative gelatino-silver-bromiodide developing-out emulsion was sensitized and exposed as in Example 1, using methyl nicotinate.

| Methyl nicotinate (cc. per liter of emulsion) | Red | | Minus blue | | Fog |
|---|---|---|---|---|---|
| | Speed | Gamma | Speed | Gamma | |
| None | 52.5 | 1.53 | 295 | 1.60 | .05 |
| 1.25 | 138.0 | 1.39 | 390 | 1.67 | .05 |

Example 3

Another batch of a fast negative gelatino-silver-bromiodide developing-out emulsion was sensitized and exposed as in Example 1, using ethyl nicotinate.

| Ethyl nicotinate (cc. per liter of emulsion) | Red | | Minus blue | | Fog |
|---|---|---|---|---|---|
| | Speed | Gamma | Speed | Gamma | |
| None | 120 | 1.6 | 725 | 1.62 | .09 |
| 1.25 | 240 | 1.59 | 815 | 1.70 | .10 |

Example 4

Another batch of a fast negative gelatino-silver-bromiodide developing-out emulsion was sensitized and exposed as in Example 1, using methyl quinaldinate.

| Methyl quinaldinate (cc. per liter of emulsion) | Red | | Minus blue | | Fog |
|---|---|---|---|---|---|
| | Speed | Gamma | Speed | Gamma | |
| None | 81.5 | 1.30 | 500 | 1.32 | .05 |
| 1.25 | 210.0 | 1.36 | 660 | 1.40 | .05 |

Example 5

A fast negative gelatino-silver-bromiodide developing-out emulsion was sensitized with 3,3'-diethyl-9-methyl-4,5,4',5'-dibenzothiacarbocyanine chloride (15 mg. per liter of emulsion) and to the spectrally sensitized emulsion was added ethyl nicotinate. A portion of the spectrally sensitized emulsion was exposed without, and another portion with the addition of the ester, through red (Wratten 25) and minus blue (Wratten 12) filters.

| Ethyl nicotinate (cc. per liter of emulsion) | Red | | Minus blue | | Fog |
|---|---|---|---|---|---|
| | Speed | Gamma | Speed | Gamma | |
| None | 67.5 | 1.52 | 300 | 1.51 | .06 |
| 1.25 | 91.0 | 1.48 | 300 | 1.46 | .06 |

*Example 6*

A fast negative gelatino-silver-bromiodide developing-out emulsion was sensitized with 3-ethyl-5-(2-ethyl-1-benzothiazolylidene-i s o p r o p y l i-dene)-2-thio-2,4(3,5)-oxazoledione (15 mg. per liter of emulsion) and to the spectrally sensitized emulsion was added ethyl nicotinate. A portion of the spectrally sensitized emulsion was exposed without, and another portion with the addition of the ester, to white light and through a minus blue (Wratten 12) filter.

| Ethyl nicotinate (cc. per liter of emulsion) | White light | | Minus blue | | Fog |
|---|---|---|---|---|---|
| | Speed | Gamma | Speed | Gamma | |
| None | 795 | 1.33 | 330 | 1.35 | .05 |
| 2.5 g | 1000 | 1.38 | 355 | 1.45 | .06 |

*Example 7*

A fast negative gelatino-silver-bromiodide emulsion was sensitized with 1',3-diethyl-6'-methoxythia-2'-cyanine iodide (20 mg. per liter of emulsion) and to the spectrally sensitized emulsion was added ethyl nicotinate. A portion of the spectrally sensitized emulsion was exposed without, and another portion with the addition of the ester, to white light and through a minus blue (Wratten 12) filter.

| Ethyl nicotinate (g. per liter of emulsion) | White light | | Minus blue | | Fog |
|---|---|---|---|---|---|
| | Speed | Gamma | Speed | Gamma | |
| None | 795 | 1.19 | 138 | 1.16 | .06 |
| 2.5 | 815 | 1.32 | 165 | 1.42 | .07 |

Some of the esters, while effecting an increase of sensitivity (speed) in some spectral region, cause a decrease in others, and must be employed with this fact in mind. In the above examples, the minus blue speed demonstrates whether or not there is a loss (or no gain) in total spectral sensitivity owing to a decrease of speed in some spectral region. Some of the esters, while effecting supersensitization, cause appreciable desensitization in the blue. Methyl picolinate is an example of such an ester.

Our invention is primarily directed to the customarily employed gelatino-silver-developing-out emulsions, such as gelatino-silver-chloride, gelatino-silver-chlorobromide, gelatino - silver - bromide and gelatino-silver-bromiodide emulsions.

Emulsions prepared in accordance with our invention can be coated in the usual manner upon any desired support, such as cellulose nitrate support, cellulose acetate support, polyvinyl acetal resin support, metal support, glass support or paper support.

What we claim as our invention and desire to be secured by Letters Patent of the United States is:

1. A photographic silver halide emulsion spectrally sensitized with a sensitizing dye selected from the group consisting of cyanine and merocyanine dyes, said emulsion containing, as a supersensitizer, a substance selected from the group consisting of esters of azine carboxylic acids and esters of 1-benzazine carboxylic acids.

2. A process for preparing a sensitized photographic emulsion comprising incorporating in a photographic silver halide emulsion a sensitizing dye selected from the group consisting of cyanine and merocyanine dyes, and also incorporating in the emulsion an ester selected from the group consisting of esters of azine carboxylic acids and esters of 1-benzazine carboxylic acids.

3. A photographic gelatino-silver-halide developing-out emulsion spectrally sensitized with a sensitizing dye selected from the group consisting of cyanine and merocyanine dyes, said emulsion containing, as a supersensitizer, a substance selected from the group consisting of esters of azine carboxylic acids and 1-benzazine carboxylic acids.

4. A process for preparing a sensitized photographic emulsion comprising incorporating in a photographic gelatino-silver-halide developing-out emulsion a sensitizing dye selected from the group consisting of cyanine and merocyanine dyes, and also incorporating in the emulsion an ester selected from the group consisting of esters of azine carboxylic acids and esters of 1-benzazine carboxylic acids.

5. A photographic gelatino-silver-halide developing-out emulsion spectrally sensitized with a cyanine dye which produces a maximum of spectral sensitivity in the emulsion at one concentration and at a higher concentration, or upon digestion of the emulsion at the lower concentration, produces a second maximum of spectral sensitivity at a wavelength longer than that of the first maximum, said emulsion containing, as a supersensitizer, an ester selected from the group consisting of esters of azine carboxylic acids and esters of 1-benzazine carboxylic acids.

6. A process for preparing a sensitized photographic emulsion comprising incorporating in a photographic gelatino-silver-halide developing-out emulsion a sensitizing cyanine dye which produces a maximum of spectral sensitivity in the emulsion at one concentration and at a higher concentration, or upon digestion of the emulsion at the lower concentration, produces a second maximum of spectral sensitivity at a wavelength longer than that of the first maximum, and also incorporating in the emulsion an ester selected from the group consisting of esters of azine carboxylic acids and esters of 1-benzazine carboxylic acids.

7. A photographic gelatino-silver-halide developing-out emulsion spectrally sensitized with a cyanine dye which produces a maximum of spectral sensitivity in the emulsion at one concentration and at a higher concentration, or upon digestion of the emulsion at the lower concentration, produces a second maximum of spectral sensitivity at a wavelength longer than that of the first maximum, said emulsion containing, as a supersensitizer, an ester of a azine carboxylic acid.

8. A photographic gelatino-silver-halide developing-out emulsion spectrally sensitized with a cyanine dye which produces a maximum of spectral sensitivity in the emulsion at one concentration and at a higher concentration, or upon digestion of the emulsion at the lower concentration, produces a second maximum of spectral sensitivity at a wavelength longer than that of the first maximum, said emulsion containing as a supersensitizer an ester of a azine carboxylic acid, the alcohol radical of the ester corresponding to an alcohol of the formula:

$$C_nH_{2n+1}OH$$

wherein $n$ represents a positive integer of from 1 to 2.

9. A photographic gelatino-silver-halide developing-out emulsion spectrally sensitized with a cyanine dye which produces a maximum of spectral sensitivity in the emulsion at one concentration and at a higher concentration, or upon digestion of the emulsion at the lower concentration, produces a second maximum of spectral sensitivity at a wavelength longer than that of the first maximum, said emulsion containing, as a supersensitizer, an ester of nicotinic acid.

10. A photographic gelatino-silver-halide developing-out emulsion spectrally sensitized with a cyanine dye which produces a maximum of spectral sensitivity in the emulsion at one concentration and at a higher concentration, or upon digestion of the emulsion at the lower concentration, produces a second maximum of spectral sensitivity at a wavelength longer than that of the first maximum, said emulsion containing, as a supersensitizer, an ester of nicotinic acid, the alcohol radical of which corresponds to an alcohol of the formula:

$$C_nH_{2n+1}OH$$

wherein $n$ represents a positive integer of from 1 to 2.

11. A photographic gelatino-silver-halide developing-out emulsion spectrally sensitized with a cyanine dye which produces a maximum of spectral sensitivity in the emulsion at one concentration and at a higher concentration, or upon digestion of the emulsion at the lower concentration, produces a second maximum of spectral sensitivity at a wavelength longer than that of the first maximum, said emulsion containing, as a supersensitizer, an ester of a 1-benzazine carboxylic acid.

12. A photographic gelatino-silver-halide developing-out emulsion spectrally sensitized with a cyanine dye which produces a maximum of spectral sensitivity in the emulsion at one concentration and at a higher concentration, or upon digestion of the emulsion at a lower concentration, produces a second maximum of spectral sensitivity at a wavelength longer than that of the first maximum, said emulsion containing, as a supersensitizer, an ester of a 1-benzazine carboxylic acid, the alcohol radical of which corresponds to an alcohol of the formula:

$$C_nH_{2n+1}OH$$

wherein $n$ represents a positive integer of from 1 to 2.

13. A photographic gelatino-silver-halide developing-out emulsion spectrally sensitized with a cyanine dye which produces a maximum of spectral sensitivity in the emulsion at one concentration and at a higher concentration, or upon digestion of the emulsion at the lower concentration, produces a second maximum of spectral sensitivity at a wavelength longer than that of the first maximum, said emulsion containing, as a supersensitizer, an ester of 2-quinoline carboxylic acid, the alcohol radical of which corresponds to an alcohol of the formula:

$$C_nH_{2n+1}OH$$

wherein $n$ represents a positive integer of from 1 to 2.

14. A photographic gelatino-silver-bromiodide developing-out emulsion spectrally sensitized with a cyanine dye which produces a maximum of spectral sensitivity in the emulsion at one concentration and at a higher concentration, or upon digestion of the emulsion at the lower concentration, produces a second maximum of spectral sensitivity at a wavelength longer than that of the first maximum, said emulsion containing, as a supersensitizer, an ester of 2-quinoline carboxylic acid, the alcohol radical of which corresponds to an alcohol of the formula:

$$C_nH_{2n+1}OH$$

wherein $n$ represents a positive integer of from 1 to 2.

15. A photographic gelatino-silver-bromiodide developing-out emulsion spectrally sensitized with a cyanine dye which produces a maximum of spectral sensitivity in the emulsion at one concentration and at a higher concentration, or upon digestion of the emulsion at the lower concentration, produces a second maximum of spectral sensitivity at a wavelength longer than that of the first maximum, said emulsion containing, as a supersensitizer, an ester of nicotinic acid.

16. A photographic gelatino-silver-halide developing-out emulsion spectrally sensitized with a merocyanine dye of low solubility, said emulsion containing, as a supersensitizer, a substance selected from the group consisting of esters of azine carboxylic acids and esters of 1-benzazine carboxylic acids.

BURT H. CARROLL.
JOHN SPENCE.

CERTIFICATE OF CORRECTION.

Patent No. 2,361,928.  November 7, 1944.

BURT H. CARROLL, ET AL.

It is hereby certified that error appears in the printed specification of the above numbered patent requiring correction as follows: Page 3, first column, lines 21 to 23, Example 6, in the heading to the table, first column thereof, for "Ethyl nicotinate (cc. per liter of emulsion)" read --Ethyl nicotinate (g. per liter of emulsion);. and that the said Letters Patent should be read with this correction therein that the same may conform to the record of the case in the Patent Office.

Signed and sealed this 30th day of January, A. D. 1945.

Leslie Frazer (Seal)  Acting Commissioner of Patents.